United States Patent
Gray et al.

(10) Patent No.: US 7,110,881 B2
(45) Date of Patent: Sep. 19, 2006

(54) MODULAR PATH PLANNER

(75) Inventors: Sarah Ann Gray, Providence, UT (US); Shane Lynn Hansen, Smithfield, UT (US); Nicholas Simon Flann, Smithfield, UT (US)

(73) Assignee: Deere & Company, Moline, IL (US)

( * ) Notice: Subject to any disclaimer, the term of this patent is extended or adjusted under 35 U.S.C. 154(b) by 427 days.

(21) Appl. No.: 10/680,307

(22) Filed: Oct. 7, 2003

(65) Prior Publication Data

US 2005/0075784 A1    Apr. 7, 2005

(51) Int. Cl.
*G01C 21/34* (2006.01)
(52) U.S. Cl. .................. 701/209; 701/200; 340/995.19
(58) Field of Classification Search .................. 701/23, 701/25, 50, 200, 210, 202, 209; 340/995.19, 340/995.21
See application file for complete search history.

(56) References Cited

U.S. PATENT DOCUMENTS

| | | | |
|---|---|---|---|
| 5,648,901 A | 7/1997 | Gudat et al. | 364/424.027 |
| 5,684,476 A | 11/1997 | Anderson | 340/988 |
| 5,793,934 A * | 8/1998 | Bauer | 700/250 |
| 5,955,973 A | 9/1999 | Anderson | 340/988 |
| 5,963,948 A | 10/1999 | Shilcrat | 707/100 |
| 5,974,347 A | 10/1999 | Nelson | 701/22 |
| 5,978,723 A | 11/1999 | Hale et al. | 701/50 |
| 5,987,383 A * | 11/1999 | Keller et al. | 701/213 |
| 5,995,902 A | 11/1999 | Monson | 701/202 |
| 6,085,130 A | 7/2000 | Brandt et al. | 701/26 |
| 6,088,644 A | 7/2000 | Brandt et al. | 701/50 |
| 6,128,574 A | 10/2000 | Diekhans | 701/209 |
| 6,141,614 A * | 10/2000 | Janzen et al. | 701/50 |
| 6,205,381 B1 | 3/2001 | Motz et al. | 701/25 |
| 6,236,924 B1 | 5/2001 | Motz et al. | 701/50 |
| 6,240,342 B1 | 5/2001 | Fiegert et al. | 701/25 |
| 6,385,515 B1 | 5/2002 | Dickson et al. | 701/28 |
| 6,445,983 B1 | 9/2002 | Dickson et al. | 701/23 |
| 6,604,005 B1 * | 8/2003 | Dorst et al. | 700/56 |
| 6,615,108 B1 | 9/2003 | Peless et al. | 700/245 |
| 6,907,336 B1 * | 6/2005 | Gray et al. | 701/50 |
| 2002/0040300 A1 | 4/2002 | Ell | 705/1 |
| 2005/0197175 A1 * | 9/2005 | Anderson | 460/1 |
| 2005/0197757 A1 * | 9/2005 | Flann et al. | 701/50 |
| 2005/0216182 A1 * | 9/2005 | Hussain et al. | 701/200 |

FOREIGN PATENT DOCUMENTS

| | | |
|---|---|---|
| CA | 2316774 | 11/2001 |
| DE | 100 25 829 A1 | 12/2001 |

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

(Continued)

*Primary Examiner*—Gary Chin

(57) ABSTRACT

A perimeter training module establishes a perimeter path plan of a vehicle including a defined perimeter. A region-filling module establishes a region-filling path plan of the vehicle within the defined perimeter. A point-to-point planning module establishes a point-to-point path plan of a vehicle including a segment of at least one of the region-filling path plan and the perimeter path plan. The path planner forms a preferential composite path plan based on the established perimeter path plan, the region-filling plan, and the point-to-point path plan.

28 Claims, 6 Drawing Sheets

OTHER PUBLICATIONS

Gunderson, R. W., Torrie, M. W., Flann, N. S., Neale, C. M. U., Baker, D. J., GIS and the Computer-Controlled Farm [online], Jul. 2000. Retrieved from the Internet <URL: http://www.autonomoussolutions.com/press.html>.

Gary, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

* cited by examiner

MODULAR PATH PLANNER

FIELD OF THE INVENTION

This invention relates to a modular path planner for planning the path of a work vehicle.

BACKGROUND OF THE INVENTION

An operator of a work vehicle may be exposed to chemicals, fertilizers, herbicides, insecticides, dust, allergens, exhaust fumes, environmental conditions, slopes, low-hanging branches, and other hazards or conditions that might be harmful or irritating to the operator. Further, an operator may not be able to achieve precise row alignment of adjacent rows because of the limited perspective of a human operator from a work vehicle or other factors. The misalignment of rows may lead to excessive or inconsistent row overlap between adjacent rows. In turn, excessive or inconsistent overlap may lead to one or more of the following: wasted fuel, wasted disbursed materials, unharvested crop, and poor aesthetic appearance of the mowed area or processed vegetation. Thus, a need exists for supporting the planning and executing of a precise path of a work vehicle to facilitate manned operation, unmanned operation, or both, of the work vehicle for mowing, harvesting, distributing fertilizer, distributing herbicides, performing agricultural work or performing other work operations.

SUMMARY OF THE INVENTION

A perimeter training module establishes a perimeter path plan of a vehicle including a defined perimeter. A region-filling module establishes a region-filling path plan of the vehicle within the defined perimeter. A point-to-point planning module establishes a point-to-point path plan of a vehicle including a segment of at least one of the region-filling path plan and the perimeter path plan. The path planner forms a preferential composite path plan based on the established perimeter path plan, the region-filling plan, and the point-to-point path plan.

DESCRIPTION OF THE PREFERRED EMBODIMENT

A work area is defined by boundaries or by multiple points that lie on the boundaries. A designated area or desired area may refer to any portion of the work area or the entire work area. For example, the designated area or desired area may refer to a desired portion of the work area to be mowed, sprayed, harvested, treated, covered, processed or otherwise traversed to accomplish a task. The boundaries of the work area and the boundaries of the desired area may be defined to be coextensive with each other, partially contiguous with each other or noncontiguous with each other.

Figure 1:
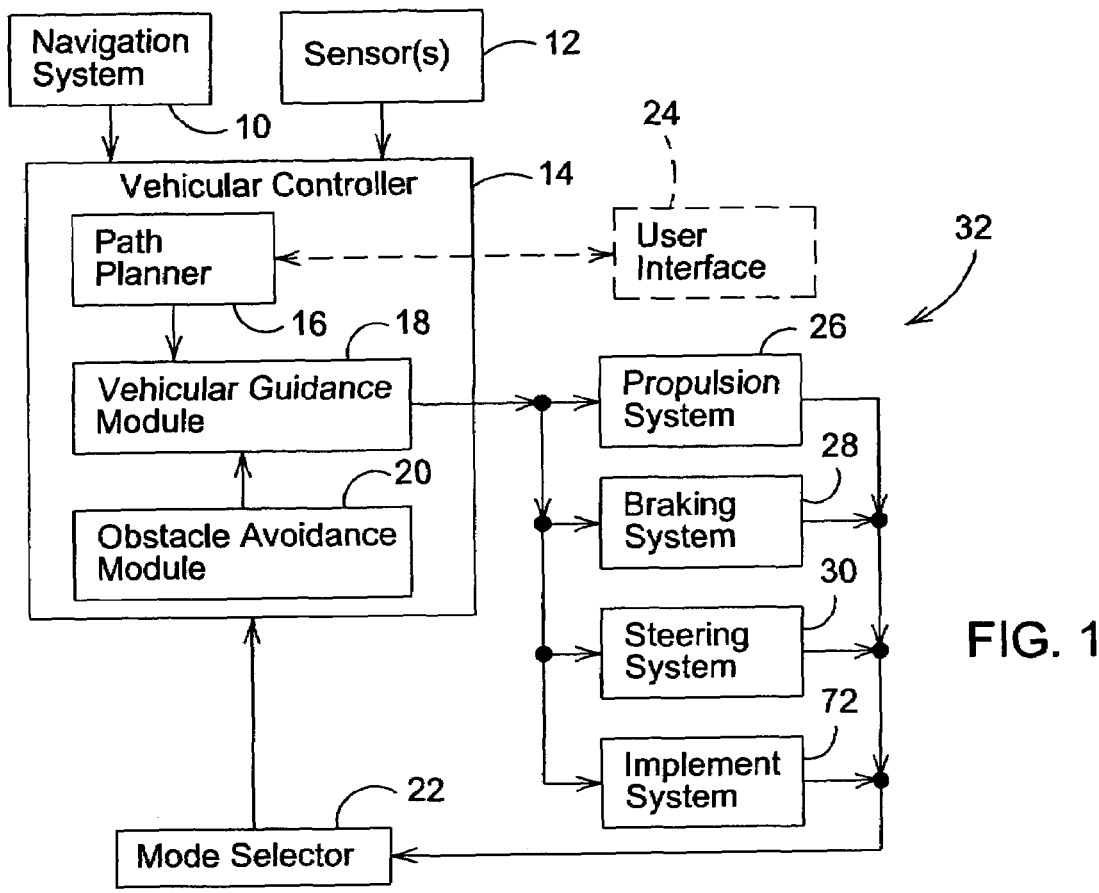
FIG. 1 is a block diagram of a vehicular electronics system in accordance with the invention.

In accordance with one embodiment of the invention, FIG. 1 shows a block diagram of a vehicle electronics system 32 for controlling a vehicle, such as a mower, a tractor, agricultural equipment, construction equipment or another work vehicle. A vehicular controller 14 is coupled to a navigation system 10 and one or more sensors 12. The vehicular controller 14 is associated with a mode selector 22 for selection of one or more modes of operation of the vehicle. The vehicular controller 14 may communicate with a propulsion system 26, a braking system 28 or a steering system 30 and/or an implement system 72.

The navigation system 10 obtains location data (e.g., geographic position or geographic coordinates) of the vehicle with respect to a reference location (e.g., a position in a work area) for the vehicle. The navigation system 10 may comprise one or more of the following: (1) a Global Positioning System (GPS) receiver with differential correction, (2) a laser navigation system that interacts with several active transmitting beacons, and (3) passive reflective beacons at corresponding known, fixed locations or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both, of electromagnetic signals (e.g., optical, infra-red or radio frequency) propagating from three or more beacons to determine location data for the vehicle as the vehicle moves throughout or around a work area. The navigation system 10 provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

In one embodiment, the vehicular controller 14 comprises a path planner 16, a vehicular guidance module 18, and an obstacle detection/avoidance module 20. The path planner 16 is capable of planning a path (e.g., a preferential composite path plan) of a vehicle based on input data, operator input, or both, via a user interface 24. The user interface 24 may comprise one or more of the following: a keypad, a keyboard, a display, a pointing device (e.g., a mouse), and a graphical user interface. The user interface 24 is shown in dashed lines to indicate that it is optional and may be disconnected from the path planner 16 or vehicular controller 14 during normal operation of the vehicle once the preferential path plan is established or input data is provided to the path planner 16.

In an alternate embodiment, the user interface 24 is not disconnected from the vehicle electronics system 32 during normal operation of the vehicle.

The vehicular guidance module 18 guides the vehicle based on the planned path (e.g., preferential composite path plan) established by the path planner 16 or otherwise provided if an operator or user authorizes or activates the vehicular guidance module 18 to control operation of the vehicle. In one embodiment, the vehicular guidance module 18 facilitates operation of the vehicle in compliance with one or more suitable modes of operation. The vehicular guidance module 18 may control or provide control signals to at least one of a propulsion system 26, a braking system 28, a steering system 30, and an implement system 72 of the vehicle generally consistent with the path plan (e.g., preferential composite path plan) of the path planner 16, navigation input from the navigation system 10, and sensor input from one or more sensors 12, unless the path plan is overridden. The operator, the vehicular controller, the obstacle detection module 20, the mode selector 22 or another control agent of the vehicle may be configured to override the path plan (even during execution of the path plan) by the vehicular guidance module 18. For example, the vehicular guidance module 18 may receive input from the obstacle detection/avoidance module 20 that results in the vehicular guidance module 18, the obstacle detection/avoidance module 20, or both, controlling to at least one of a propulsion system 26, a braking system 28, a steering system 30, and an implement system 72 to avoid striking an obstacle or to avoid intruding into a predetermined no-entry or safety zone around the obstacle.

One or more sensors 12 are used for detecting one or more of the following items: (1) the presence of defined or undefined physical structures through pattern recognition or otherwise, (2) the boundaries of the work area or desired area through optical or tactile sensing, (3) the presence of an obstacle that obstructs the planned path of the vehicle through ultrasonic sensors or otherwise, (4) the presence of one or more persons or animals, and (5) environmental conditions associated with the vehicle or its operation if the vehicle is operating an autonomous mode or a semi-autonomous mode. Environmental conditions may include data on temperature, tilt, attitude, elevation, relative humidity, light level or other parameters.

In one embodiment, the mode selector 22 supports the selection of at least one of a first mode, a second mode, and a third mode based upon the operator input. For example, the first mode comprises an operator-assisted mode, the second mode comprises a manual operator-driven mode, and the third mode comprises an autonomous mode. In a first mode, the vehicular guidance module 18 may control at least one of the propulsion system 26, braking system 28, steering system 30, and the implement system 72, while also allowing an operator to over-ride the automatic control of the vehicle provided by the vehicular guidance module 18 at any time during operation of the vehicle. Accordingly, if an operator interacts or commands at least one of the propulsion system 26, the braking system 28, the steering system 30, and the implement system 72 during the first mode, the mode selector 22 may automatically switch from the first mode to the second mode to allow the operator virtually instantaneous control over the vehicle. In a second mode, an operator of the vehicle commands or activates at least one of a propulsion system 26, a braking system 28, a steering system 30, and an implement system 72 of the vehicle. In a third mode, the vehicular guidance module 18 is adapted to guide the vehicle based upon the planned path (e.g., preferential composite path plan) and the detection of the presence of an obstacle in the work area. Although the vehicle may have three modes of operation as explained herein, in an alternate embodiment, the vehicle may have any number of modes, including at least one autonomous or semi-autonomous mode. An autonomous mode is where the vehicle has sensors 12 and a control system (e.g., vehicular electronics system 32) that allow the vehicle to complete a predefined mission and to deviate from the mission to provide for safety compliance and acceptable interaction with the environment around the vehicle.

The vehicle may be guided over a border of a work area or designated area to trace an outline of the border. The border may be stored in terms of a series of reference geographic coordinates. The navigation system 10 tracks the operational vehicular coordinates and direction of vehicular movement during operation of the vehicle for comparison to the reference geographic coordinates. The vehicular controller 14, the implement system 72, or both, may control the operation of an implement based on the operational vehicular coordinates, the direction of vehicular movement, and the reference geographic coordinates. The implement is selected from the group consisting of a cutting blade, a mowing blade, a mower, a reel mower, a rotary mower, a plow, a harrow, a cutter, a thresher, a mowing deck, a harvester, a pump, a sprayer, an implement for an agricultural machine, an attachment for an agricultural machine, an implement for a tractor, an implement for a construction machine, and an attachment for a construction machine.

Figure 2:
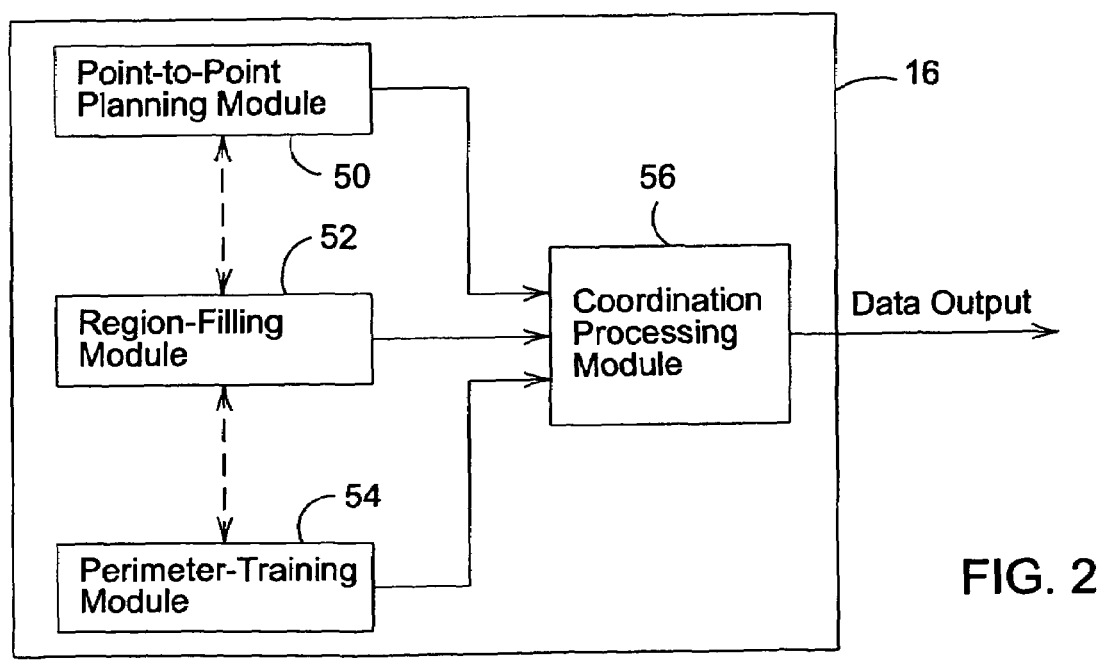
FIG. 2 is a block diagram of a path planner in greater detail than FIG. 1.

In FIG. 2, the path planner 16 comprises a coordination processing module 56 for managing a perimeter training module 54, a region-filling module 52, and a point-to-point planning module 50. The perimeter training module 54 establishes a perimeter path plan of a vehicle. The perimeter path plan includes a defined perimeter. A region-filling module 52 establishes a region-filling path plan of the vehicle within the defined perimeter. A point-to-point planning module 50 establishes a point-to-point path plan of a vehicle including a segment of at least one of the region-filling path plan and the perimeter path plan. The coordination processing module 56 forms a preferential composite path plan based on one or more of the following: the established perimeter path plan, the region-filling plan, and the point-to-point path plan. The coordination processing module 56 assembles preferential components of two or more of the established path plans to form a single preferential composite plan consistent with minimizing an economic cost of traversing the composite path plan by the vehicle.

Perimeter Training Module

The perimeter training module 54 supports the generation of a path plan or a component of a composite path plan in which the vehicle is guided around a perimeter of a work area. The perimeter training module 54 allows an operator to manually drive the vehicle along a perimeter of a desired area or work area and record position measurements (or position measurements versus time measurements) from a navigation system 10 (e.g., location determining receiver) of the vehicle. For example, the perimeter training module 54 creates an optimized, drivable path from a set of logged (Global Positioning System) GPS data. The recorded positions are filtered for noise and converted to an raw perimeter path that is stored. The recorded positions are generally consistent with the vehicular constraint (e.g., kinematics constraints) of the vehicle.

The perimeter training module 54 receives the following inputs: (1) set of location data (e.g., GPS data points) collected by driving the vehicle around the perimeter of the work area; (2) vehicle characteristics such as width, minimum turn radius, and (3) sample time or time stamps associated with corresponding collected location data points. The perimeter training module 54 outputs a path composed of tangential arcs that reflect the path that was driven by the vehicle, such that the path deviation from the actual data is less than a maximum allowable deviation.

The perimeter training module 54 reduces or eliminates measurement noise while maintaining sufficient detail to accurately fit the location data. The filter coefficients are set by a combination of the maximum velocity, minimum turning radius of the vehicle, and the filter damping parameter. The perimeter training module 54 can be tuned using the following parameters: damping factor, maximum vehicle velocity, and maximum deviation value. Decreasing the damping value tends to make the data smoother; increasing the damping value tends to make the data follow the path more closely. The maximum vehicle velocity is generally bound to a range or tolerance with respect to the actual maximum vehicle velocity during the training. A larger value of maximum deviation will allow the arcs to be farther from the data points, thus resulting in fewer arcs. A smaller value will keep the arcs closer to the data, but will require more arcs.

The perimeter training module 54 models the raw perimeter path by linking together segments (e.g., tangential arc segments). The perimeter training module 54 employs a low-pass filter for smoothing noisy data associated with the raw collected data to provide refined collected data that defines segments of a perimeter path. In one embodiment, the perimeter training module 54 has a compensation unit for compensating for sections of the collected data for the path where the vehicle backs up, closed paths where the vehicle starts and ends cross, and irregular sampling times.

Point-to-Point Planning Module

The point-to-point planning module 50 supports the generation of a point-to-point path plan or a component of a preferential composite path plan in which the vehicle is guided from an origination point and origination heading to a destination point and a destination heading. The origination point and destination point may be defined with reference to geographic coordinates, whereas the origination heading and the destination heading may be defined as angles or bearings with respect to a reference (e.g., magnetic North).

The point-to-point planning module 50 comprises a routine or software instructions that return a vehicle path from an initial position and heading to a final position and heading that avoids obstacles in the map. The point-to-point planning module 50 accepts the following inputs: (1) a polygon region and a list of "keep-out" internal polygons, (2) a vehicle of known turning radius, (3) starting position and heading, and (4) the ending position and heading. In one embodiment, the resultant point-to-point path is the shortest, or nearly the shortest, possible path from the start point to the end point of the vehicle that does not allow any part of the vehicle to intersect an object (e.g., an obstacle in the work area).

The point to point path plan provides the ability to navigate an autonomous vehicle from one location to another without any part of the vehicle striking or intercepting any obstacle within the work area or immediately adjacent thereto. The point-to-point path plan will not intersect with a stationary obstacle if the safety distance zone about the perimeter of an obstacle is larger than half of the vehicle's width. However, the safety distance zone for a mobile obstacle may need to be greater to account for unpredictable or sudden movements of a mobile obstacle. If a direct path is not possible from the start configuration to the end, then the point-to-point planning module 50 will try selecting a preferential point-to-point path plan that goes around any objects that are between the origination point and the destination point. In effect, the point-to-point path planning module 50 may model the preferential path plan for obstacle avoidance by growing one or more obstacles to include a safety zone and by shrinking the boundary to include a safety zone such that one or more candidate paths become non-drivable or otherwise noncompliant with safety concerns.

Region Filling Module

The region-filling module 52 supports the generation of a path plan or a component of a composite path plan in which the vehicle is guided over a desired portion of a work area. The region-filling module 52 may communicate with the point-to-point planning module 50, the perimeter training module 54, and the coordination processing module 56. The region-filling module 52 may extract one or more components of a point-to-point path plan, a perimeter path plan, or both, to provide a region filling path plan. The logical interconnection between the region-filling module 52 and the perimeter training module 54 is shown by dashed lines to indicate that the interconnection is optional. Similarly, the logical interconnection between the region-filling module 52 and the point-to-point training module 50 is shown by dashed lines to indicate that the interconnection is optional.

The region-filling module 52 comprises a routine or software instructions that produce a path that directs the vehicle to drive over a desired area of a work area at least once or in substantially the most efficient manner or in substantially the most rapid manner. The region-filling module 52 feature is useful for plowing, tilling, mowing, harvesting or other tasks, where the entire desired area needs to be covered by the vehicle. The region filling may be accomplished by at least the following different types of coverage solutions: (1) back-and-forth straight sweep, (2) back-and-forth contour sweep, and (3) spiral sweep. Back-and-forth straight sweep refers to a region-filling pattern that is characterized by parallel lines (spaced by the approximate width of the vehicle) over the entire area. Back-and-forth contour sweep refers to a region-filling pattern that is characterized by the user specifying a straight or curved target line as a pattern for the next travel row to the right and to the left. This target line is copied on both sides of the original until no part of the new row is inside the desired area to be covered. A spiral sweep refers to a region-filling pattern that is similar, in concept, to a seashell because the pattern starts on the outside of a shape and continually moves inward until either the entire shape has been covered or the area left inside would be covered more efficiently by a back-and-forth sweep.

The region-filling module 52 uses a routine or software instructions that accepts a complex two-dimensional description of the desired area of a work area. Although the desired area may be commensurate or equal in size and shape to that of the work area, the desired area may be different in size and shape, with any number of discontinuous geometric components. The region-filling module 52 generates a two-dimensional path such that the vehicle covers the entire desired area of the work area while avoiding any obstacles in the map. The coverage paths outputted by the region-filling module 52 can be one of three patterns: back-and-forth straight sweep, back-and-forth contour sweep, or spiral.

The region-filling module 52 may support alternating rows and striping (e.g., for mowing stadiums and golf course-type applications) when using the back-and-forth patterns. Via the user interface 24, the user can specify whether the turns at the ends of rows occur inside the work area or outside the work area. In one embodiment, the region-filling module 52 assumes that all area and obstacle boundaries are drivable by the vehicle. In addition, the region filling module 52 assumes that the object boundaries of any obstacle or object in the work area or about the work area are defined at half the vehicle width away from the actual object or obstacle to provide adequate clearance for the vehicle operation. Accordingly, by using at least a one-half width vehicle clearance from the planned path or path candidate, the region filling module can determine whether it is able to safely drive around or near the object or obstacle without contacting the object or obstacle.

Coordination Processing Module

The coordination-processing module 56 forms a composite preferential path plan based on a point-to-point path plan, a region-filling path plan, and a perimeter-training path plan. A preferential path plan refers to a sequence of two-dimensional positions or trajectories for a vehicle, along which a vehicle tracks to complete a task. A task may involve moving a vehicle from one place to another or performing other work, such as plowing, cutting, harvesting, or mowing. The positions account for the vehicle kinematics including vehicle minimum turning radius, width, and length.

The output of the path planner 16 will be a list of path straight and curved line segments for the vehicle to follow. The line segments may represent a straight line or arc depending on the value of the radius field. A segment may be defined with reference to the following: (1) start point (e.g., coordinates (Cartesian or polar) in the work area), (2) end point (e.g., coordinates (Cartesian or polar) in the work area), (3) radius–(0=straight line, <0=right "clockwise" arc, >0=left "counter-clockwise" arc), (4) velocity, which is the speed the vehicle should travel this line segment, (5) segment type path, perimeter, obstacle or the like, and (6) implement action, such as mow, spray, plow or the like. The line segment may be defined by a start point and an end point and a unique arc radius. Alternately, the line segment may be defined with reference to the center point of an arc, the radius of the arc, and the length of the arc.

Figure 3:
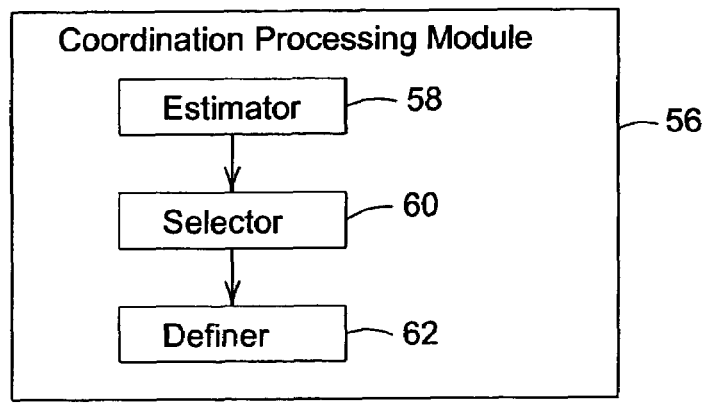
FIG. 3 is a block diagram of a coordination processing module in greater detail than FIG. 2.

FIG. 3 shows a block diagram of a coordination-processing module 56. The coordination-processing module 56 comprises an estimator 58, a selector 60, and a definer 62. During the determination of a preferential composite path plan, the estimator 58 estimates candidate path distances (e.g., total distances of paths comprising the candidate preferential path plan) of corresponding candidate composite path plans. The selector 60 selects the preferential composite path plan as the candidate composite path plan having a shortest estimated distance. The definer 62 defines the preferential composite path plan as components of two or more of the established path plans, among the point-to-point path plan, the region-filling path plan, and the perimeter path plan. The preferential composite path plan comprises an assembly of segments selected from at least two of the following: (1) the established perimeter plan, (2) the established point-to-point path plan, (3) the established region-filling path plan, and (4) an order of the assembly. The order of the assembly is based on coordination that minimizes an overall composite economic cost of the preferential composite path plan.

Figure 4:
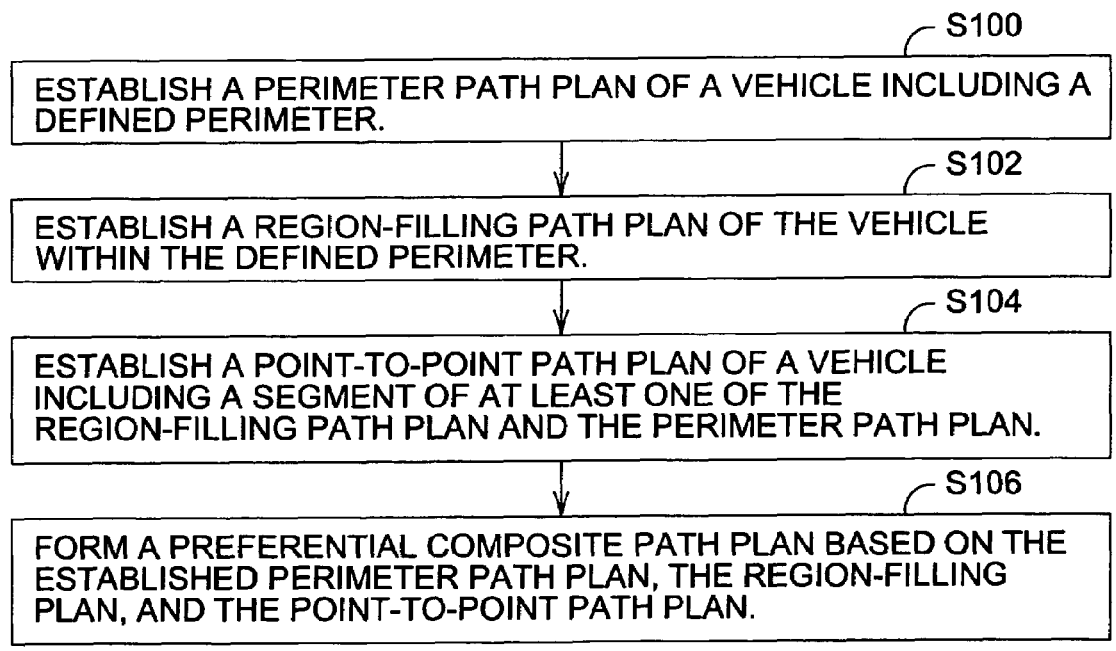
FIG. 4 is a flow chart of a method for determining a preferential composite path plan for a vehicle.

FIG. 4 illustrates a method for planning the work path (e.g., preferential composite path plan) of a vehicle. The method of FIG. 4 begins in step S100.

In step S100, a perimeter-training module 54 establishes a perimeter path plan of a vehicle. The perimeter path plan preferably includes a defined perimeter. For example, the established perimeter path plan comprises a series of interconnected segments, where a segment may comprise a generally linear segment or an arc.

The perimeter-training module 54 accepts input of the sampled perimeter points (e.g., location data) and converts the sampled perimeter points into output as a sequence of path segments that is drivable by the vehicle. If the perimeter path represents a closed loop, the endpoints of the path segments are connected tangentially with adjacent segments. However, if the perimeter path plan represents an open loop, end points of the first path segment and the last path segment may not be connected to each other. In one embodiment, the perimeter training algorithm reduces or minimizes the number of data points required to describe the path and gives the user some control over the position error that exists between the data points and the trained resultant path segments of the perimeter path plan.

In step S102, a region-filling module 52 establishes a region-filling path plan of the vehicle within the defined perimeter of step S100. For example, the established region-filling path plan comprises a series of interconnected segments, where a segment may comprise a generally linear segment or an arc. The region-filling path plan is configured to cover or traverse a desired area within the work area, while avoiding obstacles.

In step S104, a point-to-point planning module 50 establishes a point-to-point path plan of a vehicle including a segment of at least one of the region-filling path plan and the perimeter path plan. For example, the established point-to-point path plan comprises a series of interconnected segments where a segment may comprise a generally linear segment or an arc. The point-to-point path plan is not necessarily defined as a single linear segment that interconnects an origination point and a destination point because an obstacle, impassable terrain or other hazards may intervene between the origination point and the destination point, among other factors. Accordingly, the point-to-point planning module 50 may define an obstacle within the work area or within the operation zone between the starting point and destination point. The obstacle may represent a mobile object or a stationary object. In one embodiment, the obstacle is defined as a polygonal shape or zone in which movement of the vehicle is prohibited.

The point-to-point path plan is determined by identifying a list of candidate paths and searching the candidate paths for a preferential path with a minimal economic cost of traversal. The preferential path comprises the shortest path between the starting point and the destination point that avoids intersecting with any obstacle by a desired margin or zone of safety. The shortest path may contain a generally rectilinear portion, a generally straight portion, and a generally curved portion, or some combination of the foregoing portions to avoid one or more obstacles. If the obstacles are mobile, the definition of the preferential path (e.g., the shortest path) may change over time. Further, if the time of completion of the path is less important than vehicular energy conservation, the shortest path may involve stopping and waiting until a mobile obstacle passes, rather than deviating from a straight line path.

In step S106, the coordination processing module 56 forms a preferential composite path plan based on the established perimeter path plan of step S100, the region-filling plan of step S102, and the point-to-point path plan of step S104. For example, the preferential composite path plan comprises a series of interconnected segments where a segment may comprise a generally linear segment or an arc.

Step S106 may be accomplished in accordance with several techniques, which may be applied cumulatively or alternately. Under a first technique, the formation of the preferential composite path plan comprises selecting preferential components of two or more of the established plans to form the preferential composite plan consistent with minimizing an economic cost of traversing the composite path plan by the vehicle.

Under a second technique, the formation of the preferential composite path plan includes estimating candidate path distances of corresponding candidate composite path plans. A preferential composite path plan is selected as the candidate composite path plan having a shortest estimated distance. The preferential composite path plan is defined as components of two or more of the established plans.

Under a third technique, the preferential composite path plan comprises an assembly of segments selected from at least two of the following: (1) the established perimeter plan, (2) the established point-to-point path plan, (3) the established region-filling path plan, and (4) an order of the assembly. The order of the assembly is based on coordination that minimizes an overall composite economic cost of the preferential composite path plan.

Figure 5:
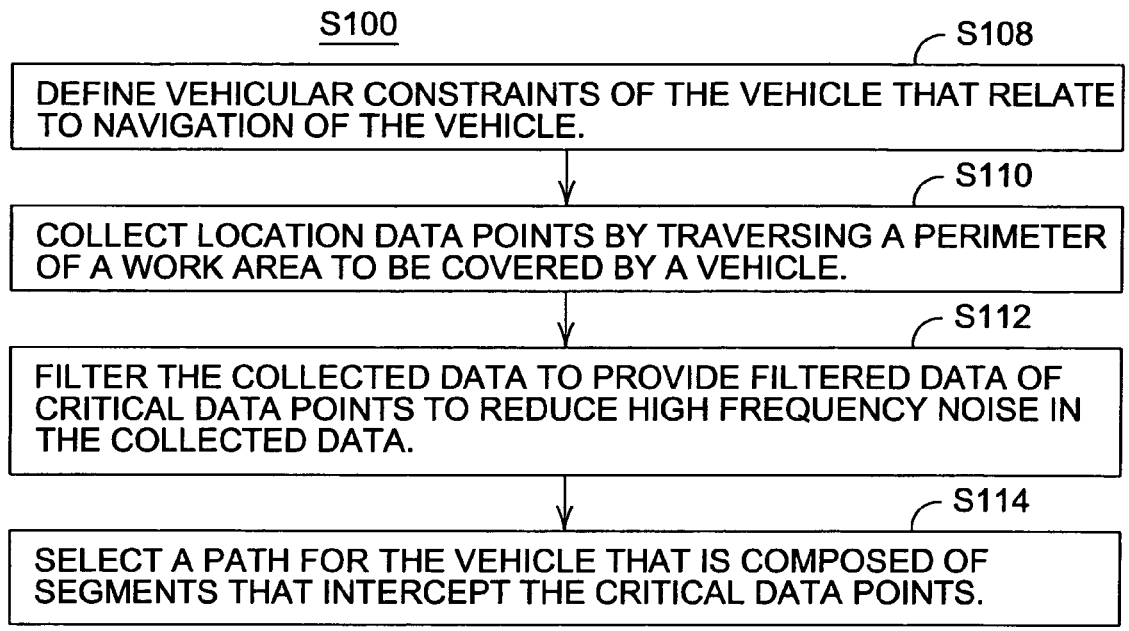
FIG. 5 is a flow chart of a method for determining a perimeter path plan for a vehicle.

FIG. 5 is a block diagram of a method for path planning for a vehicle, which shows step S100 in greater detail than FIG. 4 does. The method of FIG. 5 begins in step S108.

In step S108, vehicular constraints are defined that relate to the navigation of a vehicle. For example, the vehicular constraints may include definitions of turning radius, maximum vehicular speed, and other parameters that effect the handling, performance or drivability of the vehicle.

In step S110, a navigation system 10 (e.g., a location-determining receiver) collects location data points by traversing a perimeter of a work area to be covered by a vehicle. Training refers to traversing of the perimeter of the work area by the vehicle in advance of doing a task or work associated with the work area. Step S110 may include course filtering of the data to accomplish one or more of the following: (a) removal of outlying location data points that are inconsistent with other collected location data and (b) removal of stationary location data points that are duplicative or cumulative with other collected data points.

The perimeter training module 54 may be programmed with one or more of the following assumptions:

(1) During training, the navigation system 10 (e.g., the location-determining receiver) collects location data that is equally spaced in time or space;

(2) The "noise" associated with the location data has zero mean and is either broadband or high frequency;

(3) The accuracy of the location data is adequate to steer the vehicle within acceptable tolerances;

(4) The noise associated with the location data is additive to the actual position; and (5) During the training, the path is created by a vehicle with Ackerman steering or that naturally follows generally circular arcs.

In step S112, a path planner 16 or a filter filters the collected location data to provide filtered location data of critical data points to reduce high frequency noise in the collected location data. The filter has filter parameters, such as a cutoff frequency and filter coefficients. The cutoff frequency of the filter may be calculated based on at least one of the following factors: a maximum velocity of the vehicle during the collecting step, minimum turning radius of the vehicle, duration between samples collected during the collecting step, and a damping factor for the filter. The filter coefficients may vary with the type of filter. In one embodiment, the filter comprises a Butterworth filter, for example.

To some extent, specification of the filter is dependent on the vehicle that will drive the trained path. The save vehicles, vehicles with similar characteristics, or characteristic compensated vehicles may be used for the training and subsequently for traversing the work area as trained. The frequency response and the slew rate of the chosen filter must be considered in order to avoid attenuating desired information while adequately attenuating the measurement noise. The minimum pass frequency of the filter (e.g., low-pass filter) can be specified by the maximum frequency present in the time sequence and that frequency is given by the following equation: $f_{passmin} = f_{max} = V_{max}/2\Pi r_{min}$, where $f_{passmin}$ is the minimum pass frequency, $V_{max}$ is the maximum velocity of the vehicle, and $r_{min}$ is the minimum turning radius of the vehicle. The minimum pass frequency is dependent on the maximum velocity and the minimum turning radius of the vehicle. For example, the maximum velocity of the vehicle is the maximum velocity that the vehicle reaches during training. The filter is chosen based on a calculation of the highest frequency component possibly present in the waveform of the cancelled location data, which is dependent on the minimum turning radius of the vehicle and the maximum vehicle velocity.

In step S114, a path planner 16 selects a path for the vehicle that is composed of segments that intercept the critical location data points. For example, the segments may comprise generally tangential arcs. The selection of the path may be accomplished by executing the following steps: a path angle is calculated at each point in the path to validate the critical location data points. The critical location data points are looped through while skipping candidate points. A distance is determined from a candidate point to an arc. The candidate point is designated as a disregarded point if the determined distance is greater than a threshold. However, the candidate point is regarded as a critical point if the determined distance is less than or equal to a threshold. If any candidate point is newly designated or changed to a critical point, the looping is modified to include the newly designated critical location data point.

Figure 6:
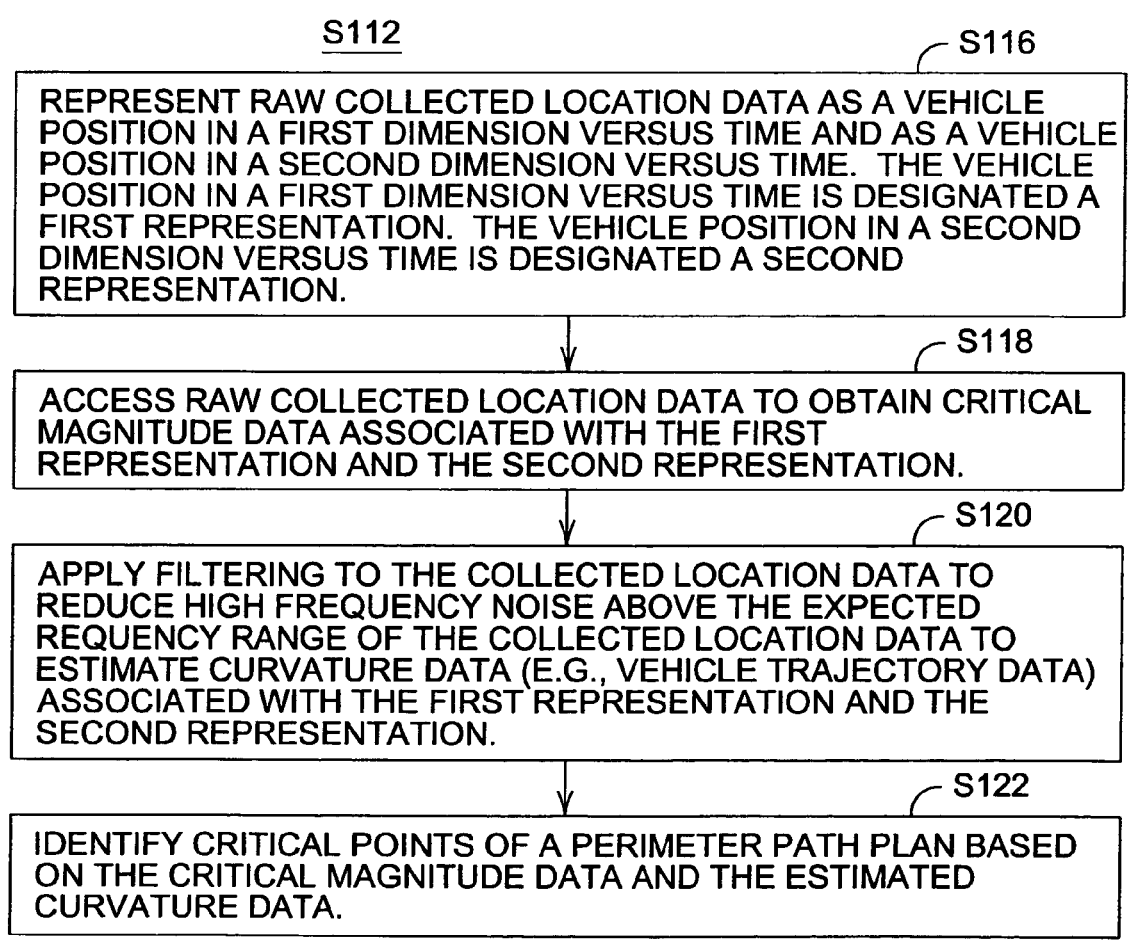
FIG. 6 is a flow chart of a method for filtering data associated with the formation of a perimeter path plan.

FIG. 6 is a block diagram of a method for path planning for a vehicle. FIG. 6 shows step S112 of FIG. 5 in greater detail. The method of FIG. 6 begins with step S116.

In step S116, raw collected location data may be represented as a vehicle position in a first dimension (e.g., x axis measurement) versus time and vehicle position in a second dimension (e.g., y axis measurement) versus time. The first dimension (e.g., x axis measurement) may be generally perpendicular to the second dimension (e.g., y axis measurement). The raw collected location data is measured at generally uniform time intervals or at otherwise known time intervals. The vehicle position in the first dimension versus time may be designated a first representation, whereas the vehicle position in the second dimension versus time may be designated a second representation.

The first representation and the second representation may be modeled as a simple or complex sinusoidal waveform if the vehicle is traveling in a generally straight line. The simple sinusoidal waveform may be expressed by the following equation:

$P(t) = S\sin(\omega t) + N\sin(\omega t)$, where $P(t)$ is the raw collected location data as a function of time, $S\sin(\omega t)$ is the desired signal component, $N\sin(\omega t)$ is the noise signal component, $S$ is the magnitude of the true position of the vehicle, $N$ is the noise magnitude, $\omega$ is any frequency in the frequency range of the collected position data, and $t$ is time.

In step S118, raw collected location data is accessed to obtain critical magnitude data. For example, pre-filtered magnitude data is extracted as the critical magnitude data from the first representation, the second representation, or both. The raw magnitude data provides an indication of the position of the vehicle to model the vehicular movement as an instantaneous curvature prior to application of low pass filtering that might otherwise attenuate the magnitude of the location data.

In step S120, filtering is applied to the collected location data to reduce high frequency noise above the expected frequency range of the location position data. For example, zero-phase, low-pass filtering is applied to the first representation, the second representation, or both. A low pass filter with zero-phase filtering or a pass-reject filter with zero-phase filtering eliminates or reduces problems with phase distortion that might otherwise be present the resultant phase of the filtered collected location data. The filtering of step S120 reduces high-frequency noise ($N\sin(\omega t)$) in the collected data above a certain maximum frequency or cut-off frequency of the collected location data. The filtered, collected location data is used to estimate a curvature data (e.g., signed instantaneous curvature data), trajectory, or vehicular heading associated with each collected data location point.

In step S122, critical data points are identified based on the critical magnitude data and estimated curvature data. A series of critical data points of the collected position data define a position and a heading of the vehicle, a velocity vector of the vehicle or another representation of the planned perimeter path.

Figure 7:
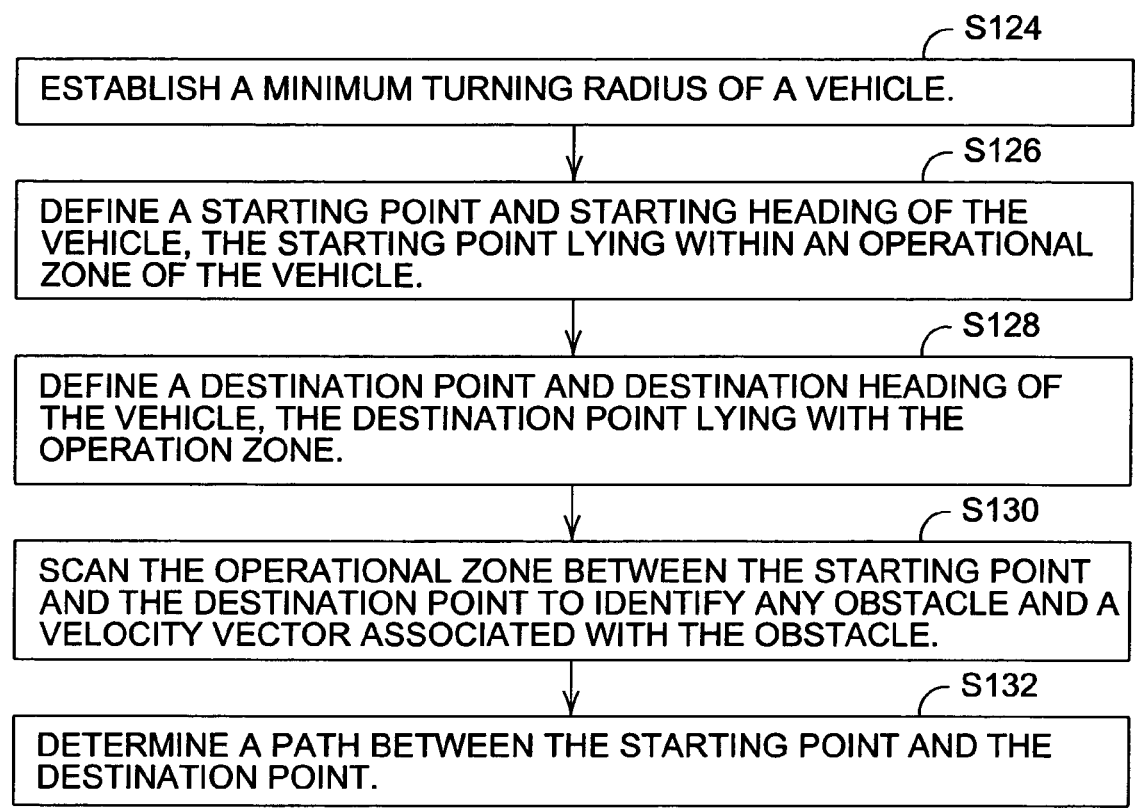
FIG. 7 is a method for determining a point-to-point path plan for a vehicle.

FIG. 7 is a flow chart of method of path planning. The method of FIG. 7 begins in step S124.

In step S124, a minimum turning radius of a vehicle is established. The minimum turning radius of the vehicle may be governed by the wheel-base, steering configuration (e.g., two wheel steering, four wheel steering, Ackerman steering) or other design or physical constraints of the vehicle.

In step S126, an origination point and a starting heading of a vehicle is defined. The origination point lies within an operational zone of the vehicle. The operational zone may be coextensive with the work area or may include a greater area than the work area. In one embodiment, a user (e.g., a vehicle operator, administrator or technician) may define a origination point and starting heading of a vehicle via a user interface 24 to a vehicular electronics system 32 (e.g., a vehicular electronics system that includes a path planner).

In step S128, a destination point and a destination heading of the vehicle are defined. The destination point of the vehicle lies within the operational zone. In one embodiment, a user (e.g., a vehicle operator, administrator or technician) may define a destination point and a destination heading of a vehicle via a user interface 24 to a vehicular electronics system 32 (e.g., a vehicular electronics system that includes a path planner).

In step S130, the operational zone or work area between the origination point and the destination point is scanned to identify any obstacle and a velocity vector (e.g., including any hazard or impassible region) associated with the obstacle. Step S130 may further include defining an obstacle, as a stationary object or mobile object, within the operation zone between the origination point and destination point. For example, the obstacle is defined as a polygonal shape in which the vehicle must not enter and/or must maintain a boundary about the polygonal shape in accordance with one or more navigational rules. The mobile obstacle may have an estimated velocity (e.g., magnitude and a direction), expressed in vector form, for instance. The estimated velocity may be expressed as a function of time.

In step S132, a preferential point-to-point path is determined between the origination point and the destination point 23. The point-to-point path is determined by identifying a list of candidate paths and searching the candidate paths for a preferential path with a minimal economic cost of traversal. In one example, the preferential path comprises the shortest path between the origination point and the destination point that avoids intersecting with any obstacle by a desired margin of safety. In another example, the preferential path comprises the most economical path between the origination point and the destination point that avoids intersecting with any obstacle by a desired margin of safety.

The searching of step S132 may be executed in accordance with the following steps: constructing a visibility graph of edges and nodes; searching the visibility graph with a search algorithm (e.g., A* algorithm); and applying at least one filter to eliminate undesired solutions of the search algorithm (e.g., A* algorithm) to enhance efficiency of the searching.

Figure 8:
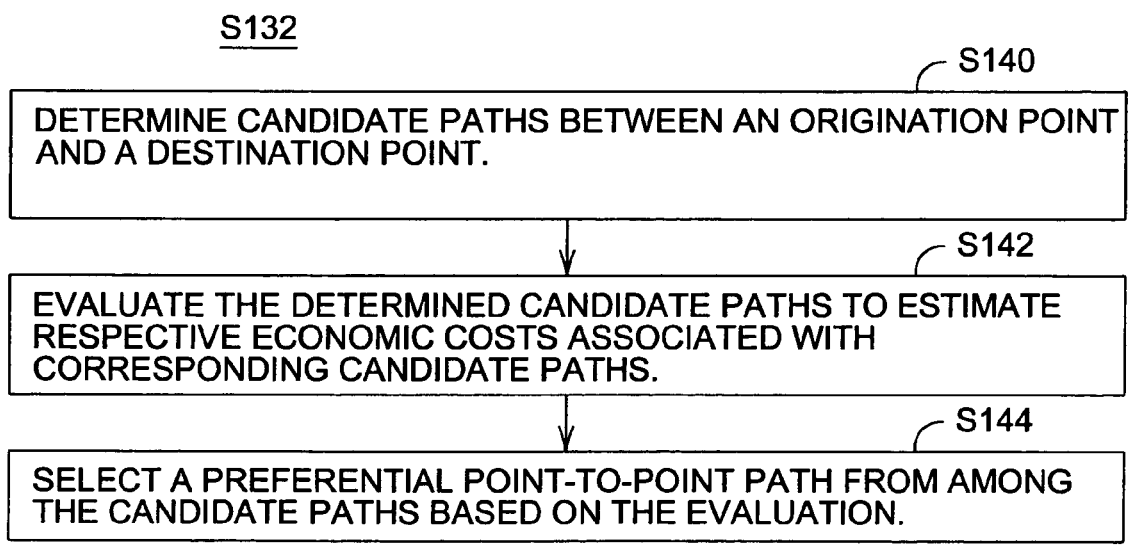
FIG. 8 illustrates the determination of a point-to-point path plan.

FIG. 8 illustrates the searching of step S132 of FIG. 7 in greater detail. The method of FIG. 8 begins in step S140.

In step S140, candidate paths are determined between an origination point and a destination point. The candidate paths may represent complete or partial paths. Complete paths are paths that are possible for the vehicle to traverse from the origination point to the destination point. Partial paths are paths that do not extend entirely from the origination point to the destination point because the paths are blocked by an obstacle, prohibited by a terrain or geographical constraint or otherwise impossible.

In one embodiment, the candidate paths are expressed in the form of a visibility graph. The visibility graph consists of edges and nodes where the edges represent direct drivable paths through free space (i.e. not crossing any of the obstacles or going outside the border of the work area) and nodes represent choice points where paths merge and split. There are five kinds of possible paths (edges) in a visibility graph: (a) paths from the start configuration to the end configuration (if clear); (b) paths from the start configuration to the borders of any of the obstacles; (c) paths from the borders of any of the obstacles to the end configuration; (d) paths around the obstacles; and (e) paths leaving an obstacle and arriving at an obstacle (possibly the same obstacle). The paths along the edges of the graph are the possible direct connections between the starting configuration, the ending configuration, and the obstacles.

In step S142, candidate paths are evaluated to estimate respective economic costs associated with corresponding candidate paths. The candidate paths may be rejected if the candidate paths exceed a threshold maximum economic cost, for example.

In one embodiment, the candidate paths or visibility graphs are searched in accordance with a search algorithm. A search algorithm (e.g., A* algorithm) is used to search the visibility graph to find the shortest (or cheapest) path from the start configuration to the end configuration. Once the visibility graph has been constructed, a graph search is performed starting at the start configuration to find the minimum cost path to the end configuration.

In one embodiment, the point-to-point planning module 50 engages in a search routine or search program instructions. The search routine further comprises: constructing a visibility graph of edges and nodes; searching the visibility graph with an search algorithm (e.g., A* algorithm); applying at least one of a straight line cost filter; and a maximum allowed touch filter to eliminate solutions of the search algorithm (e.g., A* algorithm) to enhance efficiency of the searching. Although a prodigious assortment of search algorithms may be used, the A* search algorithm in one illustrative example of a search for algorithms for finding a preferential path plan for the work vehicle to cover a designated portion of the work area.

The A* search algorithm uses the following notation, constants, and functions:

S denotes a solution (either empty, partial or complete). A solution represents a path plan. A complete solution represents a preferential path plan. A partial solution represents an estimate or candidate path plan, which may or may not represent a preferential path plan.

W is a constant, a large negative number (such as −10,000). The user may define the threshold minimum number.

Depth(S) is the depth of the solution S (the count of the number of expansions it has had). An expansion is a potential solution or candidate path plan.

Q denotes a priority queue with priority function Score (S), where S is an item on the Queue.

Pop(Q) returns the lowest scoring item on the queue or data stack. The queue or data stack may represent a series of registers of data storage, magnetic data storage, optical data storage, memory, volatile computer memory or the like.

Push(Q, S) pushes S onto the queue Q or data stack.

Domain dependent functions:

G(S) is the cost of the partial solution so far;

H(S) is the estimated cost to complete the partial solution;

F(S) is simply G(S)+H(S), a lower bound on the final cost of S;

Expand(S) returns a list of new children solutions created by expanding the partial solution S;

Complete?(S) returns true when S is a complete solution; false otherwise.

In accordance with one technique for executing step S104, the A* Algorithm may be used to search for an optimal or preferential path plan solution to the visibility graph in accordance with the following software instructions.

Let Score(S)=F(S)
Let S be the empty solution, push(Q, S)
Let best_solution=false
  While Not(best_solution)
    S=pop(Q)
      If Complete?(S) then
        best=S
    Else For all s Î Expand(S)
      Do Push(Q,s)
Finally Return best The above A* algorithm does not generally employ a bound to limit the computational iterations of possible candidate path plans and attendant computational resources. The first solution A* finds will be optimal so long as the H function never overestimates the true cost to complete the solution. Such an H function is called an admissible heuristic because it may be used to decide which solutions are considered complete and which are not.

To A* algorithm considers the following items:
(1) The initial solution consists of an empty path beginning at the starting configuration;
(2) The cost of a solution so far is the sum of the individual costs of the edges (e.g., candidate paths) in the solution so far;
(3) The solution expansion function takes a solution and returns a set of children solutions (e.g., candidate paths).

For purposes of illustration, consider a partial solution that arrived at a first obstacle going in a first direction (e.g., counter-clockwise) with respect to the first obstacle. The partial solution can be expanded to follow the border of the first obstacle in the same direction as the first direction (e.g., counter-clockwise), then to leave the first obstacle at a tangent to arrive at another obstacle in any direction (e.g., clockwise or counter-clockwise) where a clear direct path exists between the first obstacle and the subsequent obstacle. The estimated cost to complete the solution may be represented by a lower bound on the cost to complete the solution. The more accurate this lower-bound, the better performance the search engine, in that better quality solutions will be found faster and less memory will be consumed. Two filters or heuristics are used to estimate this lower bound and these are discussed in the next section.

The cost to complete a partial path from the start configuration may be estimated or candidate paths eliminated in accordance with two filtering techniques that may be applied alternatively or cumulatively. Under the first filtering technique, the traditional straight-line path cost from the last position in the path to the end position is estimated. This estimate will always underestimate the true cost to complete any path since it ignores turning radius constraints and the possible interference of one or more obstacles. The preferential path can be limited to paths that exceed the straight-line path cost by a known or fixed amount, consistent with empirical or statistical studies of a particular environment (e.g., a lawn, an agricultural field, a vineyard, or orchard) of a work area.

Under the second filtering technique, unnecessary looping through the obstacles is eliminated or minimized by application of a maximum-touches filter to limit the maximum number of touches or approaching of the limits of obstacles (or their corresponding safety zones about the perimeters of corresponding obstacles).

For example, consider a convex internal obstacle that lies between the origination point and destination point in a given work area with one or more obstacles. The filter eliminates solutions that touch (i.e., arrive, follow the shape border, then depart) a particular obstacle once during the solution path construction. Any partial solution that touches this shape more than once will be non-optimal and can be discarded. In general, the maximum allowed touches would be one plus the number of concavities of the shape. The rule is different for the outside border shape. Here the maximum number of touches allowed is simply the number of concavities. The maximum-allowable touch filter assigns a very large number to a partial solution if the path exceeds the maximum allowed touches on any obstacle. In this way, the partial solution is discarded (is never popped off the heap) during further search. The maximum-allowable touch filter is particularly effective when there are many internal obstacles since it forces the search process to expand paths that make progress towards the goal, rather than loop among shapes that have already been touched shapes.

The point-to-point planning module 50 may dynamically create the portions of the visibility graph that are needed; and using the two admissible heuristics to focus and prune the search produces an effective and efficient algorithm that can rapidly solve complex point-to-point problems. To save memory of the vehicular controller 14 or path planner 16, the visibility graph is not pre-computed and stored. Rather, only those parts of the visibility that are needed to expand the current partial solution are dynamically constructed, used to create the new children solutions, and then discarded. In this way, more processing time is used because the same tangent paths between shapes are re-computed many times. However, the memory requirements of the algorithm are significantly reduced. It turns out that the time penalty incurred is small since the tangent path computations are fast.

In step S144, the preferential point-to-point path is selected from among the candidate paths based on the evaluation. The preferential point-to-point path leaves the starting position at an origination heading, arrives at the ending position at a destination heading, does not intersect any of the "keep-out" polygons, and never turns at a radius that is less than the minimum turning radius of the vehicle such that the total cost of the path is minimized. The point-to-point path planning module 50 finds a preferential path (e.g., optimal path) from one location to another in a cluttered environment or an open-space environment. The path might be restricted to a desired area (e.g., a pathway or road) within the work area. The point-to-point planning module considers kinematic constraints of the vehicle. For example, the vehicle is unable to make right angle turns because Ackerman steered vehicles are unable to change heading in an instant. The preferential point-to-point path avoids intersection with buildings or other objects in the work area. The preferential point to point path may represent the shortest time path or the path that supports minimization of resource consumption (e.g., fuel consumption).

Figure 9:
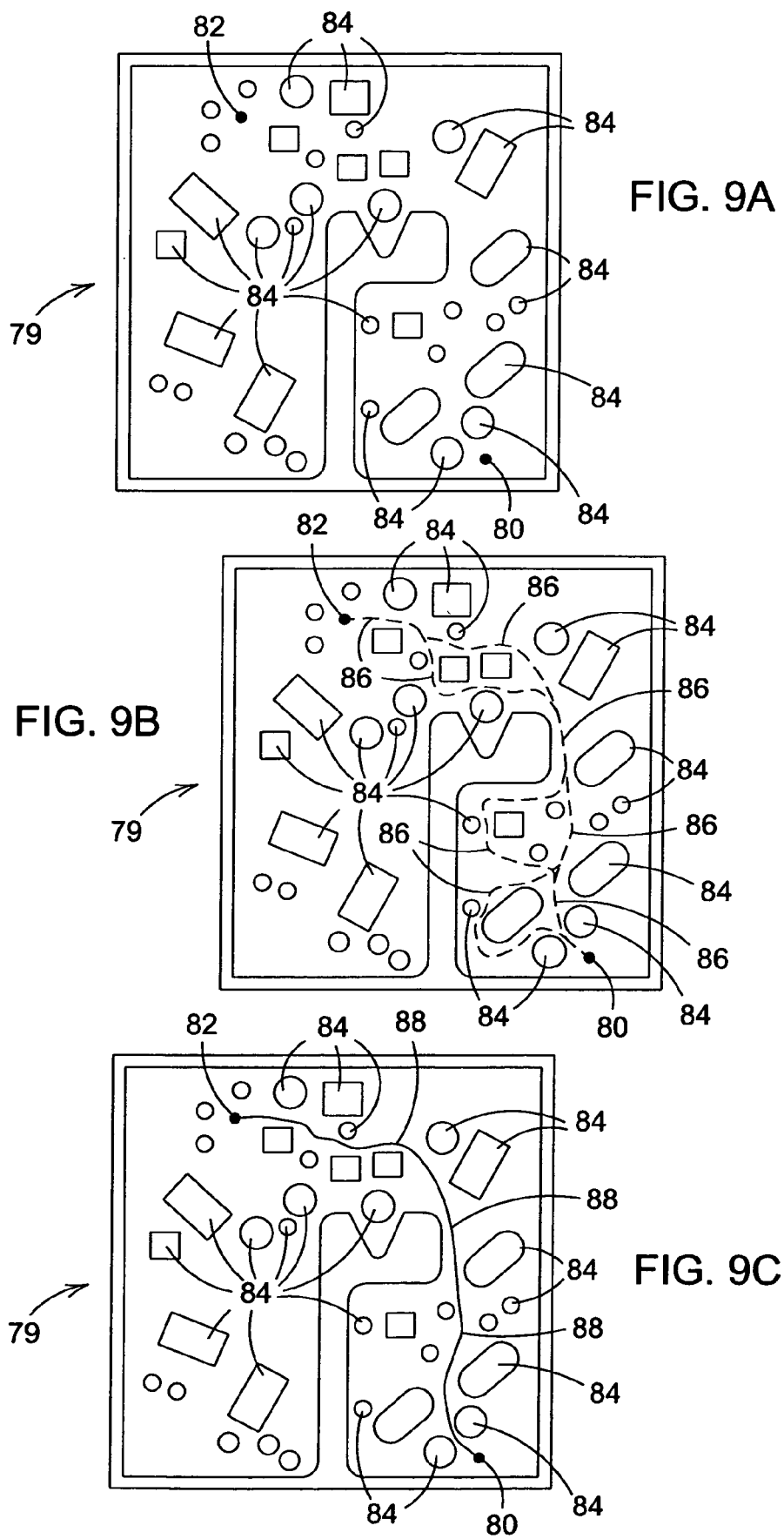
FIG. 9A is a top view of work area that contains obstacles between an origination point and a destination point.
FIG. 9B is a top view of a work area that contains candidate point-to-point paths between an origination point and a destination point.
FIG. 9C is a top view of a work area that illustrates a preferential point-to-point path plan around the obstacles.

FIG. 9A is a top view of work area 79 that contains obstacles 84 between an origination point 80 and a destination point 82 of a planned path. The obstacles 84 may be identified by sensors associated with the vehicle, by sensors located off-board the vehicle or by static definitions of stationary obstacles 84 (e.g., trees in a residential yard) in a work area 79.

FIG. 9B is a top view of the work area 79 that contains candidate point-to-point paths 86 between an origination point 80 and a destination point 82. If the turning radius of the vehicle is greater than zero and the shapes represent drivable paths around the actual obstacles 84, then the direct paths between shapes will all be straight lines that leave and arrive at tangents. The shapes facilitate establishing candidate point-to-point paths 86 as generally smooth aggregate paths of straight lines and arcs. The arc must be greater than a minimum turning radius of the vehicle. Given any two internal shapes, it is possible to create direct paths between the two internal shapes that leave and arrive at counter-clockwise arc-segments of the internal shapes.

FIG. 9C is a top view of a work area that illustrates a preferential point-to-point path plan 88 around the obstacles 84. The preferential point-to-point path plan 88 represents a subset of the candidate point-to-point paths 86. The preferential point-to-point path of FIG. 9C utilizes the borders of the given obstacles 84 as part of its path. The actual obstacles 84 and outside border are pre-processed to take into account the width of the vehicle and its minimum turning radius. This means that the map boundary is shrunk and the internal obstacles 84 are grown such that the vehicle can safely follow the object borders.

Figure 10:
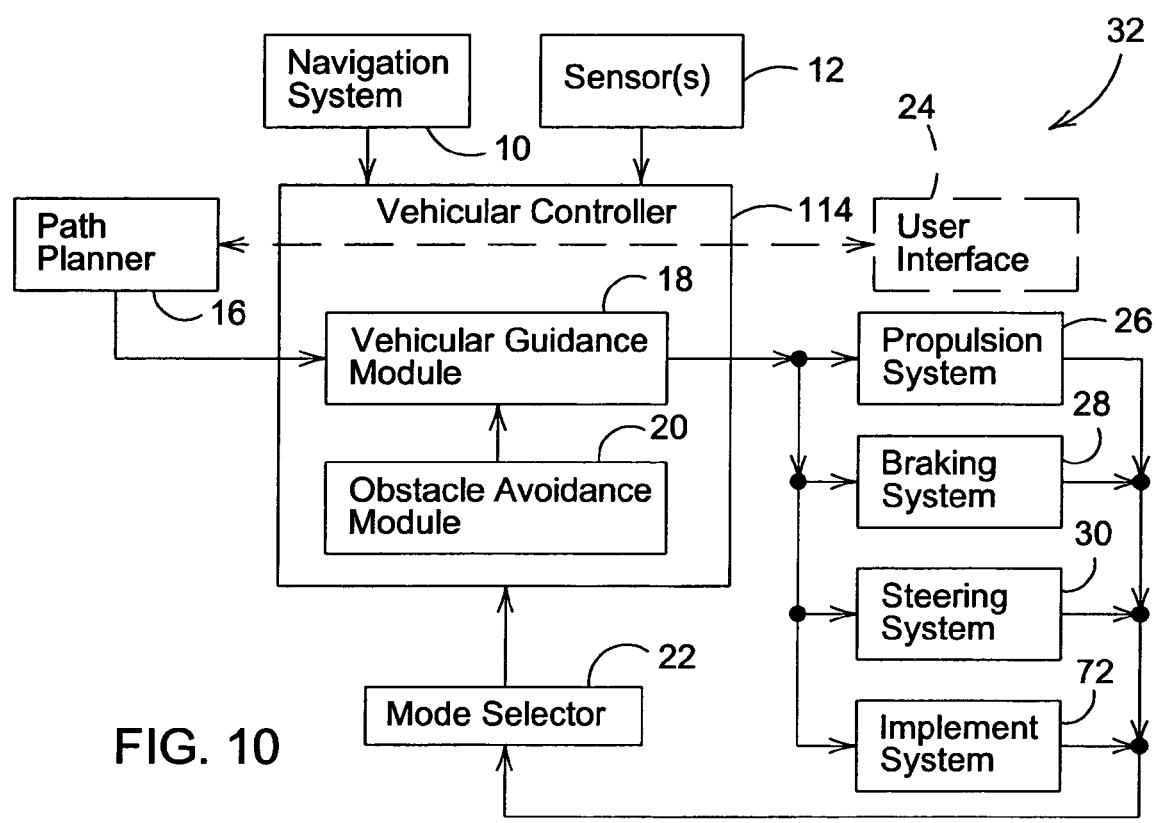
FIG. 10 is an alternate embodiment of a block diagram of a vehicular electronics system in accordance with the invention.

FIG. 10 is a block diagram of a vehicular control system that is similar to that of FIG. 1, except the vehicular controller 114 of FIG. 10 excludes the path planner 16 integrated therein. Rather, the path planner 16 of FIG. 10 is configured separately from the vehicular controller 114, but the path planner 16 and the vehicular controller 114 of FIG. 10 collectively perform the same functions as the vehicular controller 14 and the path planner 16 of FIG. 1. Like reference numbers in FIG. 1 and FIG. 10 indicate like elements.

Work vehicles that safely adhere to a planned path may be used to eliminate or reduce the exposure of a human operator to chemicals, fertilizer, herbicides, insecticides, dust, allergens, exhaust fumes, environmental conditions, slopes, low-hanging branches, and other hazards that might be harmful or irritating to an operator. Further, the planned path of a work vehicle may be completed with precision which equals or exceeds that of a human operator to obtain a desired aesthetic appearance.

Having described the preferred embodiment, it will become apparent that various modifications can be made without departing from the scope of the invention as defined in the accompanying claims.

What is claimed is:

1. A method for planning a path of a vehicle, the method comprising:
    establishing a perimeter path plan of the vehicle including a defined perimeter, the perimeter path plan comprising a least one segment;
    establishing a region-filling path plan of the vehicle within the defined perimeter, the region-filling path plan comprising a series of interconnected segments;
    establishing a point-to-point path plan of the vehicle including at least one of the segments of at least one of the region-filling path plan and the perimeter path plan; and
    forming a preferential composite path plan comprising a list or ordered assembly of the segments by estimating candidate path distances of corresponding candidate composite paths and selecting a shortest candidate path as the preferential composite path based on the established perimeter path plan, the region-filling plan, and the point-to-point path plan, each segment being curved or straight and defined by a start point, an end point, and an arc radius.

2. The method according to claim 1 wherein the forming comprises: selecting preferential components of two or more of the established plans to form the preferential composite plan consistent with minimizing an economic cost of traversing the composite path plan by the vehicle.

3. The method according to claim 1 wherein the forming comprises:
    estimating candidate path distances of corresponding candidate composite path plans, where each candidate composite path plan comprises a list of the segments for evaluation;
    selecting the preferential composite path plan as the candidate composite path plan having a shortest estimated distance; and
    defining the preferential composite path plan as components of two or more of the established plans.

4. The method according to claim 1 wherein the preferential composite path plan comprises an assembly of segments selected from at least two of the established perimeter plan, the established point-to-point path plan, and the established region-filling path plan; an order of the assembly based on coordination that minimizes an overall composite economic cost of the preferential composite path plan.

5. The method according to claim 1 wherein the established perimeter path plan comprises a series of interconnected segments; the established point-to-point path plan comprises a series of interconnected segments; the established region-filling path plan comprises a series of interconnected segments, each of the interconnected segments selected from the group consisting of a generally linear segment and an arc.

6. The method according to claim 1 wherein the establishing of the perimeter path plan comprises:
defining vehicular constraints of the vehicle that relate to navigation of the vehicle;
collecting location data points by traversing a perimeter of a work area to be covered by the vehicle;
filtering the collected data to provide filtered data of critical data points to reduce high frequency noise in the collected data; and
selecting a path for the vehicle that is composed of segments that intercept the critical data points.

7. The method according to claim 6 wherein the segments that intercept the critical data points comprise tangential arcs.

8. The method according to claim 6 wherein the filtering further comprises:
dividing the collected data into at least one of a temporal sequence and a spatial sequence indicative of vehicular position with reference to a first axis and a second axis, the first axis being generally perpendicular to the second axis;
accessing pre-filtered magnitude data of the collected data to determine critical magnitude data;
applying a zero-phase filtering to the collected data to determine critical phase data;
identifying the critical data points based on the critical magnitude data and the critical phase data.

9. The method according to claim 6 wherein the filter further comprises:
calculating a cutoff frequency of a filter based on at least one of a maximum velocity of the vehicle during the collecting step, minimum turn radius, duration between samples collected during the collecting step, and a damping factor for the filter;
calculating filter coefficients for the filter.

10. The method according to claim 9 wherein the filter comprises a Butterworth filter.

11. The method according to claim 6 wherein the selection further comprises:
calculating a path angle at each point in the path;
looping through the critical points while skipping candidate points;
determining a distance from a candidate point to an arc;
designating the candidate point as a disregarded point if the determined distance is greater than a threshold.

12. The method according to claim 11 wherein the selection further comprises:
designating the candidate point as a critical point if the determined distance is less than or equal to the threshold and revising the looping to include the newly designated critical point.

13. The method according to claim 1 wherein said establishing the point-to-point path plan comprises:
establishing a minimum turning radius of a vehicle;
defining a starting point and starting heading of the vehicle, the starting point lying within an operational zone of the vehicle;
defining a destination point and destination heading of the vehicle, the destination point lying with the operation zone;
scanning the operational zone between the starting point and the destination point to identify any obstacle and a velocity vector associated with the obstacle; and
determining a point-to-point path between the starting point and the destination point consistent with avoidance of a collision with the obstacle and the established minimum turning radius.

14. The method according to claim 13 further comprising:
defining the obstacle, as a stationary object, within the operational zone between the starting point and destination point.

15. The method according to claim 13 wherein the obstacle is defined as a polygonal shape in which the vehicle must keep out in accordance with a navigational rule.

16. The method according to claim 13 wherein the point-to-point path is determined by identifying a list of candidate paths and searching the candidate paths for a preferential path with a minimal economic cost of traversal.

17. The method according to claim 16 wherein the preferential path comprises the shortest path between the starting point and the destination point that avoids intersecting with any obstacle by a desired margin of safety.

18. The method according to claim 16 wherein the searching further comprises:
constructing a visibility graph of edges and nodes;
searching the visibility graph with an A* algorithm;
applying at least one of a straight line cost filter and a maximum allowed touch filter to eliminate solutions of the A* algorithm to enhance efficiency of the searching.

19. A method for establishing a point-to-point path plan, the method comprising:
establishing a minimum turning radius of a vehicle;
defining a starting point and starting heading of the vehicle, the starting point lying within an operational zone of the vehicle;
defining a destination point and destination heading of the vehicle, the destination point lying with the operation zone;
scanning the operational zone between the starting point and the destination point to identify any obstacle and a velocity vector associated with the obstacle; and
determining a path between the starting point and the destination point consistent with avoidance of a collision with the obstacle and the established minimum turning radius.

20. The method according to claim 19 further comprising:
defining an obstacle, as a stationary object, within the operation zone between the starting point and destination point.

21. The method according to claim 19 wherein the obstacle is defined as a polygonal shape in which the vehicle must keep out in accordance with a navigational rule.

22. The method according to claim 19 wherein the path is determined by identifying a list of candidate paths and searching the candidate paths for a preferential path with a minimal economic cost of traversal.

23. The method according to claim 22 wherein the preferential path comprises the shortest path between the starting point and the destination point that avoids intersecting with any obstacle by a desired margin of safety.

24. The method according to claim 19 wherein the searching further comprises:
constructing a visibility graph of edges and nodes;
searching the visibility graph with an A* algorithm;
applying at least one of a straight line cost filter and a maximum allowed touch filter to eliminate solutions of the A* algorithm to enhance efficiency of the searching.

25. A system for planning a path of a vehicle, the system comprising:
a perimeter training module for establishing a perimeter path plan of the vehicle including a defined perimeter, the perimeter path plan comprising a least one segment;
a region-filling module for establishing a region-filling path plan of the vehicle within the defined perimeter, the region-filling path plan comprising a series of interconnected segments;
a point-to-point planning module for establishing a point-to-point path plan of the vehicle including at least one of the segments of at least one of the region-filling path plan and the perimeter path plan; and
a coordination module for forming a preferential composite path plan comprising a list or ordered assembly of the segments by estimating candidate path distances or corresponding candidate composite paths and selecting a shortest candidate path as the preferential composite path based on the established perimeter path plan, the region-filling plan, and the point-to-point path plan, each segment being curved or straight and defined by a start point, an end point, and an arc radius.

26. The system according to claim 25 wherein the coordination module comprises preferential components of two or more of the established plans to form the preferential composite plan consistent with minimizing an economic cost of traversing the composite path plan by the vehicle.

27. The system according to claim 25 wherein the coordination module comprises:
an estimator for estimating candidate path distances of corresponding candidate composite path plans, where each candidate composite path plan comprises a list of the segments for evaluation;
a selector for selecting the preferential composite path plan as the candidate composite path plan having a shortest estimated distance; and
a definer for defining the preferential composite path plan as components of two or more of the established plans.

28. The system according to claim 25 wherein the preferential composite path plan comprises an assembly of segments selected from at least two of the established perimeter plan, the established point-to-point path plan, and the established region-filling path plan; an order of the assembly based on coordination that minimizes an overall composite economic cost of the preferential composite path plan.

* * * * *